United States Patent [19]

Ehret

[11] 4,355,827
[45] Oct. 26, 1982

[54] PIPE SWIVEL JOINT FOR AMBIENT AND CRYOGENIC TEMPERATURES

[75] Inventor: Thomas M. Ehret, Malay Le Grande, France

[73] Assignee: FMC Corporation, Chicago, Ill.

[21] Appl. No.: 205,124

[22] Filed: Nov. 10, 1980

[30] Foreign Application Priority Data

Nov. 27, 1979 [FR] France ................................ 79 29183

[51] Int. Cl.³ ............................................ F16L 17/00
[52] U.S. Cl. ....................................... 285/98; 285/14; 285/187; 285/276; 277/26
[58] Field of Search .................... 285/187, DIG. 4, 98, 285/14, 351, 276, 281; 277/26

[56] References Cited

U.S. PATENT DOCUMENTS

| | | | |
|---|---|---|---|
| 1,666,495 | 4/1928 | Hodgkinson | 285/187 X |
| 3,361,430 | 1/1968 | Reid | 285/187 X |
| 3,433,488 | 3/1969 | Grantom | 285/276 X |
| 4,139,220 | 2/1979 | Faccon | 285/276 X |
| 4,221,408 | 9/1980 | Lochte et al. | 285/276 |

FOREIGN PATENT DOCUMENTS 1301683  1/1973  United Kingdom ................ 285/276

*Primary Examiner*—Dave Arola
*Attorney, Agent, or Firm*—W. William Ritt, Jr.; Richard B. Megley

[57] ABSTRACT

A swivel joint for connecting together a pair of pipes and for transferring fluid between the pipes at ambient temperatures and at cryogenic temperatures. A cryogenic seal between the joint's relatively rotatable inner and outer elements prevents fluid leakage at cryogenic temperatures, and an ambient seal assembly between the joint elements provides a seal at ambient temperatures and prevents fluids from contacting the cryogenic seal. The ambient seal assembly includes an elastomeric O-ring retained in the outer element, and an annular sealing ring fastened to the inner element and spring-biased towards the O-ring. At ambient temperatures the sealing ring is held against the O-ring in a fluid-tight manner. As the temperature decreases, a plurality of rods or wires, or an annular sleeve, having a high coefficient degree of linear expansion, contracts and pulls the annular sealing ring away from the adjacent O-ring to prevent wear of, and other damage to, the O-ring at low temperatures.

12 Claims, 5 Drawing Figures

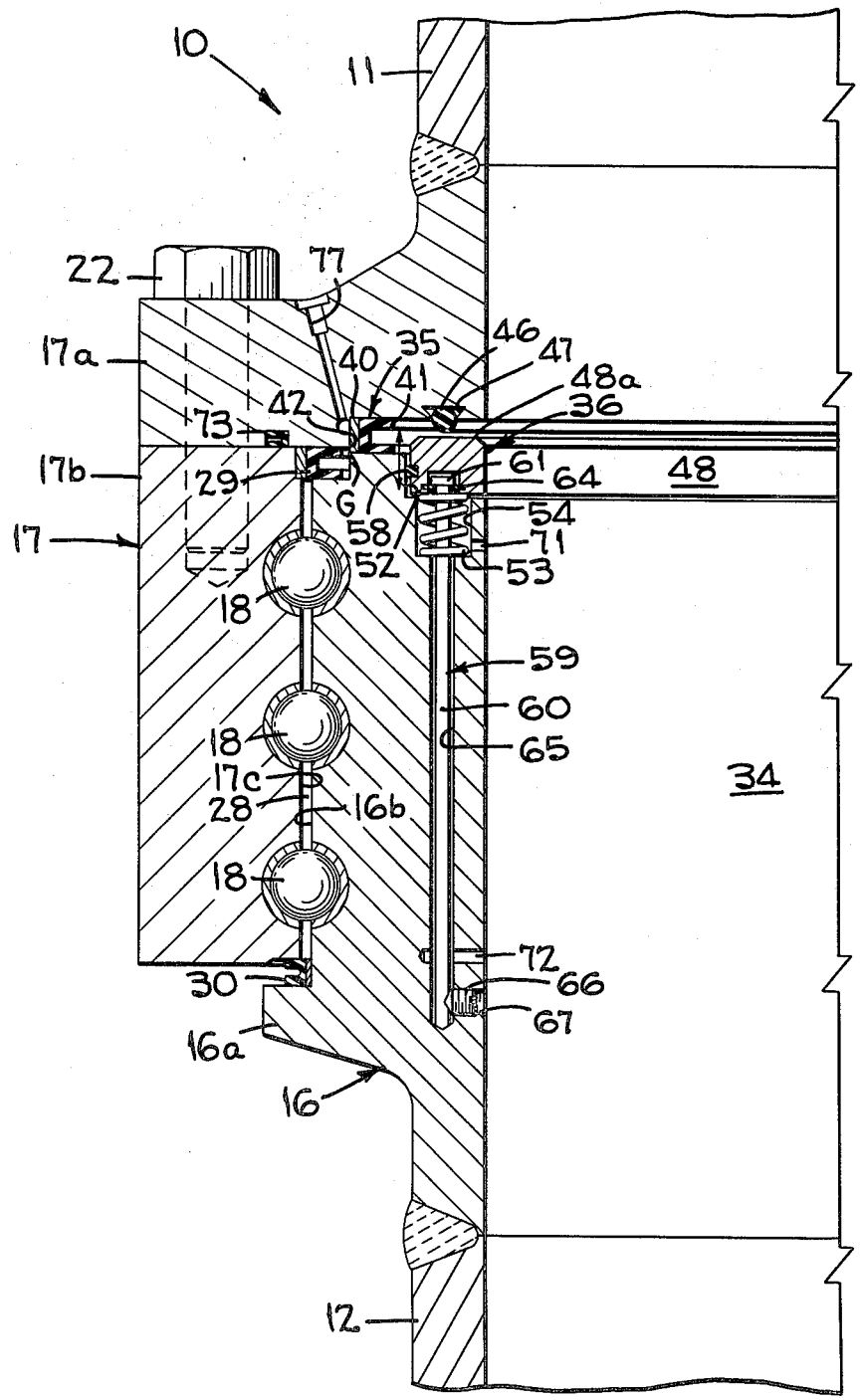

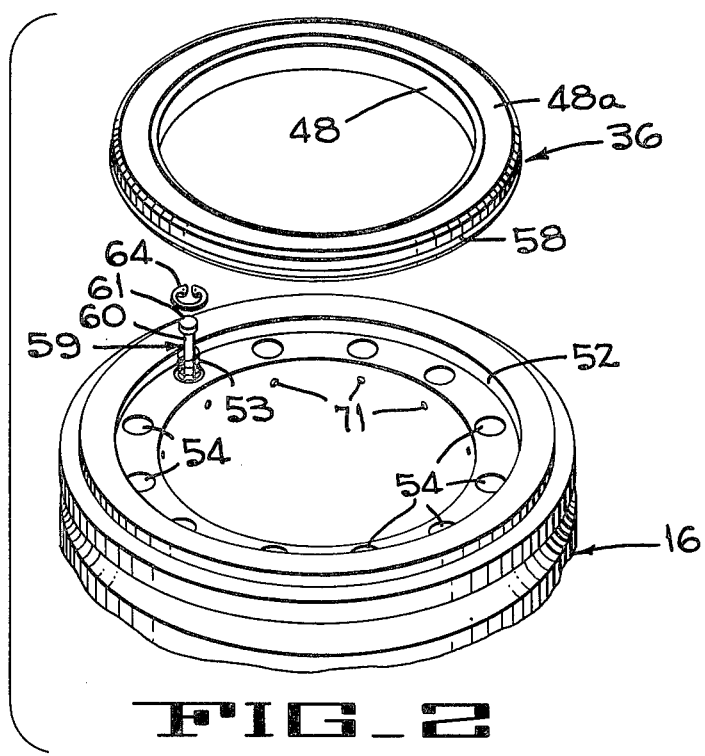
FIG_2
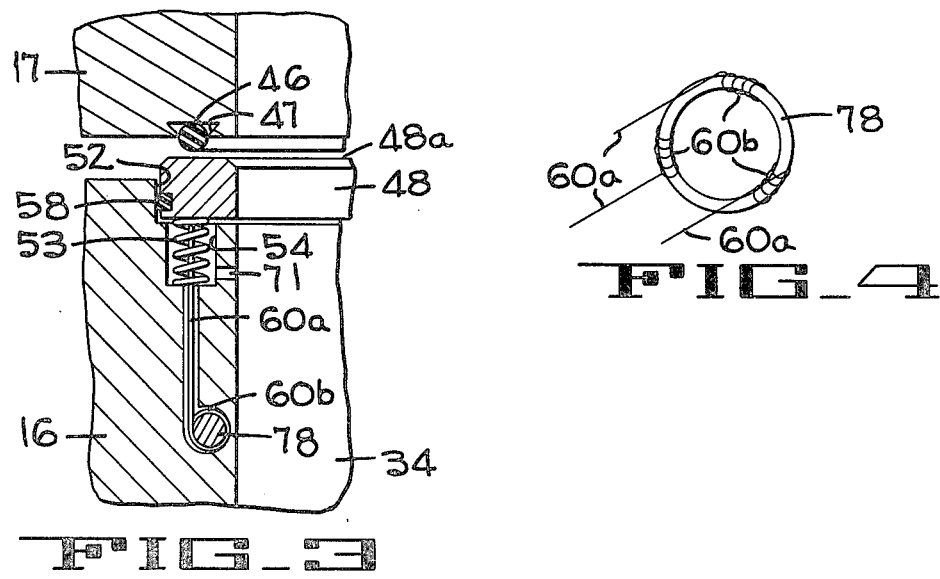
FIG_3
FIG_4

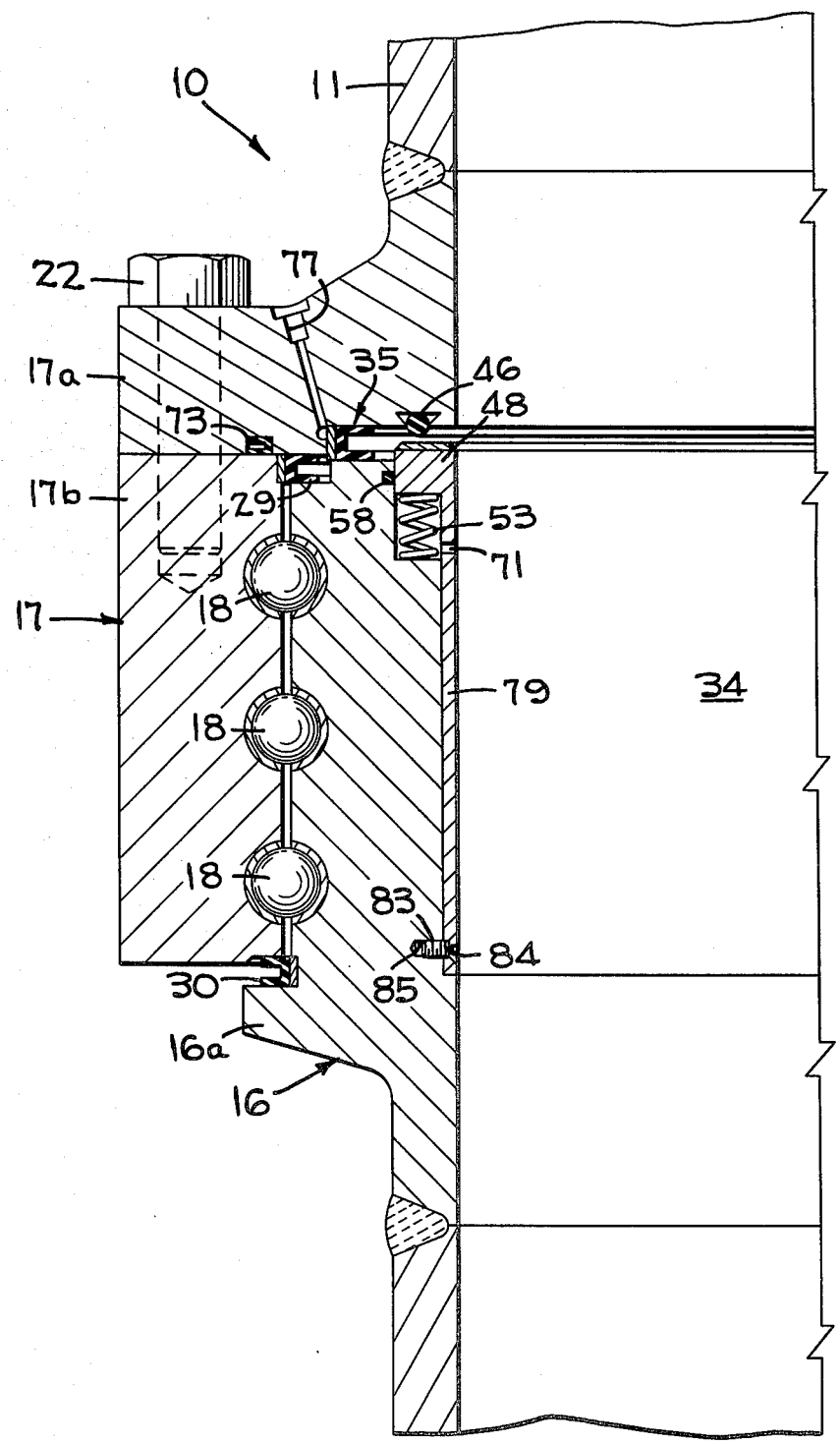

PIPE SWIVEL JOINT FOR AMBIENT AND CRYOGENIC TEMPERATURES

BACKGROUND OF THE INVENTION

1. Field of the Invention

This invention relates to pipe swivel joints, and more particularly, to swivel joints for transferring fluid between pipes at both ambient and cryogenic temperatures.

2. Description of the Prior Art

Pipe swivel joints are commonly used in many industries for interconnecting lengths of metal pipe to form an articulated flow conduit between two locations. Such a swivel joint includes relatively rotatable annular inner and outer elements interconnected by rollable bearing elements retained in a bearing race chamber defined by the outer surface of the inner element and the inner surface of the outer element. Annular seals are employed in the joints to prevent fluid from leaking out of the joint's flow passage into the bearing race chamber and to the outside of the joint. When the swivel joints are to be employed at ambient temperatures, elastomeric seals are commonly used to effect a fluid-tight seal. However, at cryogenic temperatures such seals are not satisfactory because they lose their resilience and thus their sealing ability. Elastomeric seals are also fragile at low temperatures and could be damaged if they are pressed against a portion of the swivel joint which moves over the surface of the elastomeric seal.

Prior art swivel joints for use at cryogenic temperatures generally employ a seal formed of a polymer of tetrafluoroethylene or trifluorochloroethylene. These polymers do not provide as good a seal at ambient temperatures as the elastomeric materials so these joints are usually used only with fluid at cryogenic temperatures.

SUMMARY OF THE INVENTION

The present invention overcomes some of the disadvantages of the prior art by employing an ambient sealing means for sealing a swivel joint at ambient temperatures, and a cryogenic sealing means for sealing the same swivel joint at cryogenic temperatures. The ambient sealing means is mounted at a junction of the inner and outer elements and presses against these elements to provide a fluid-tight seal at ambient temperatures. The cryogenic sealing means is mounted at another junction of the inner and outer elements to provide a fluid-tight seal at cryogenic temperatures, and a means is provided for retracting a portion of the ambient sealing means away from its functional position when the temperature at the functional position decreases below a predetermined value. This combination allows the more efficient ambient sealing means to provide a fluid-tight seal at ambient temperatures and prevents this ambient sealing means from being damaged when the swivel joint is used at cryogenic temperatures.

BRIEF DESCRIPTION OF THE DRAWINGS

FIG. 1 is a vertical section of a pipe swivel joint having both an ambient sealing means and a cryogenic sealing means between the inner and the outer joint elements.

FIG. 2 is an isometric drawing of a portion of the swivel joint of FIG. 1, showing details of the ambient sealing means.

FIG. 3 is a vertical section of a portion of another embodiment of the swivel joint of FIG. 1, showing the ambient sealing means and apparatus for retracting it.

FIG. 4 is an isometric drawing of a portion of the embodiment of FIG. 3 showing details of the apparatus for retracting the ambient sealing means.

FIG. 5 is a vertical section of a third embodiment of pipe swivel joint according to the present invention showing another apparatus for retracting the ambient sealing means.

DESCRIPTION OF THE PREFERRED EMBODIMENT

Referring now to the drawings, FIG. 1 discloses a swivel joint 10 for connecting together a pair of pipes 11 and 12, the joint 10 comprising an annular inner or male element 16, an annular outer or female element 17 surrounding the male element 16, and a plurality of ball bearings 18 that rotatably interconnect the male and female elements 16 and 17. The outer element 17 includes a radially inward extending flange 17a secured to a sleeve-like element 17b by a plurality of capscrews 22 (only one shown). The inner element 16 includes a radially outward extending flange 16a. The ball bearings 18 reside in an annular bearing race chamber 28 that is defined by an outer surface 16b of the element 16, an inner surface 17c of the element 17b, and a pair of annular dynamic seals 29,30 between the elements 16,17. The dynamic fluid seal 29 (FIG. 1) is retained in functional position between the inward extending flange 17a and the adjacent end of the inner element 16, and the dynamic fluid seal 30 is likewise retained between the outward extending flange 16a and the adjacent end of the outer element 17.

The junction between the flange 17a and the adjacent end of the inner element 16 is sealed to prevent leakage from the joint's fluid flow passage 34 by a cryogenic sealing means 35 and an ambient sealing means 36. The cryogenic sealing means includes an annular anti-extrusion ring 40 of metal or other suitable material, and a generally U-shaped annular sealing element 41 of Teflon or other deformable material suitable for use at cryogenic temperatures. The spring action of the annular ring 40 biases it radially outward against a shoulder 42 on the flange 17a, and the seal element 41 fits tightly against the ring 40. Since the sealing means 35 may be employed with high fluid pressures, there is some danger that a portion of the element 41 might be extruded into a gap G between the inner and outer elements unless the anti-extrusion ring 40 is employed to block the gap. If the joint is used only with low pressures, the ring 40 may be omitted.

The ambient sealing means 36 (FIG. 1) includes an annular elastomeric O-ring seal 46 retained in an annular groove 47 in the flange 17a, and an annular seal ring 48 positioned in a counterbore 52 in the upper end of the swivel joint's inner element 16. When the swivel joint 10 is used at ambient temperatures an end surface 48a of the ring 48 is pressed against the O-ring 46 by a plurality of helical springs 53 (FIGS 1-3) each mounted in a corresponding one of a plurality of circumferentially-spaced axial bores 54 in the inner element 16. An annular O-ring or other suitable seal element 58 provides a tight seal between the ring 48 and the axial surface of the counterbore 52. The result is that the O-ring 46 and the seal ring 48 provide a fluid-tight seal between the flow passage 34 and the cryogenic sealing means 35 at ambient temperatures.

When the swivel joint 10 is employed at cryogenic temperatures the ring 48 is withdrawn from contact with the O-ring 46 (FIG. 1) by a temperature sensitive retracting means 59. The retracting means 59 includes a plurality of circumferentially spaced rods 60 made from a material having a high coefficient of linear expansion, such as a polymer of tetrafluoroethylene or trifluorochloroethylene, the former known by the tradename Teflon. An enlarged upper end 61 (FIG. 1) of each of the rods 60 is secured to the ring 48 by a snap ring or other suitable retainer 64, and each rod 60 extends axially in a bore 65 parallel to the axis of the flow passage 34, with the lower end of each rod 60 connected to the swivel joint's inner element 16 by a setscrew 66 that extends through a radial port 67. Each of the axial bores 65 communicates with the flow passage 34 by means of two radial bores 71,72 that permit fluid from the flow passage to move into the bores 65 and equalize the temperature of the rods 60 with the temperature of the fluid in the passage 34.

An annular seal 73 (FIG. 1) prevents leakage of fluid between the flange 17a and the adjacent end of the sleeve element 17b. A generally axial bore 77 allows any fluid which may leak past the sealing means 35,36 to be vented to the outside of the swivel joint 10, rather than possibly being forced through the seal 29 into the race bearing chamber 28 where such fluid could contaminate lubricant in said bearing chamber.

A second embodiment of pipe swivel joint according to the present invention is shown in FIGS. 3 and 4. In this embodiment each rod 60a (only one shown) includes an end portion 60b that is coiled around a mounting ring 78. The coiled portion 60b increases the length of the rod and produces a greater distance of movement of the other end of the rod when the temperature changes. This greater movement causes the seal ring 48 to be moved further from the O-ring 46 when the joint operates at cryogenic temperatures, and thus allows the joint 10 to be shorter in axial length.

A third embodiment of the pipe swivel joint 10, shown in FIG. 5, employs a cylinder 79 having the same high coefficient of linear expansion as the rod 60 of FIG. 1. The upper end of the cylinder 79 is suitably secured to the ring 48, or the cylinder 79 and the ring 48 can be formed as a single unit as illustrated in FIG. 5. The lower end of the cylinder 79 is secured to the inner element 16 by a plurality of screws 83 (only one shown in FIG. 5) each extending through a radial bore 84 in the cylinder 79 and threaded in a bore 85 in the inner element 16.

Thus it will be understood from the foregoing that the present invention provides an ambient temperature sealing means between the inner and outer elements of a pipe swivel joint to develop a fluid-tight seal when the swivel joint operates at ambient temperatures. When the swivel joint operates at cryogenic temperatures the ambient temperature sealing means is retracted and a cryogenic sealing means provides a fluid-tight seal. A temperature sensitive retracting means retracts the ambient temperature sealing means to prevent damage to the sealing means when extremely low temperatures are present in the swivel joint.

Although the best mode contemplated for carrying out the present invention has been herein shown and described, it will be apparent that modification and variation may be made without departing from what is regarded to be the subject matter of the invention.

What is claimed is:

1. A pipe swivel joint for connecting together a pair of pipes and for transferring fluid between said pipes at ambient and at cryogenic temperatures, said joint comprising:
   an annular inner element having an inner surface and an outer surface;
   an annular outer element surrounding said inner element said outer element having an inner surface and an outer surface;
   an annular bearing race chamber between said inner and outer elements;
   bearing means mounted in said race chamber to retain said outer element in surrounding relationship with said inner element and to facilitate relative rotational movement of said elements;
   an ambient sealing means in sealing engagement between said inner and outer elements to provide a seal between said elements at ambient temperatures;
   means for repositioning said ambient sealing means out of said sealing engagement when the temperature at said junction decreases below a predetermined value; and
   a cryogenic sealing means between said inner and said outer elements to provide a seal between said elements at cryogenic temperatures.

2. A pipe swivel joint as defined in claim 1 wherein said ambient sealing means is positioned between said cryogenic sealing means and the inner surface of said inner element.

3. A pipe swivel joint as defined in claim 1 wherein a first bearing seal is mounted between said bearing race chamber and said cryogenic sealing means and a second bearing seal is mounted between said bearing race chamber and the outer surface of said outer element.

4. A pipe swivel joint as defined in claim 1 wherein said ambient sealing means includes an annular O-ring seal secured to said outer element, an annular inner seal secured to said inner element with said inner seal adjacent said O-ring seal, temperature sensitive means for pressing said inner seal against said O-ring seal at ambient temperatures and means for moving said inner seal away from said O-ring seal at cryogenic temperatures.

5. A pipe swivel joint as defined in claim 4 wherein said means for moving said inner seal away from said O-ring includes a material having a high coefficient of linear expansion, and means for connecting said high coefficient material between said inner seal and said inner element.

6. A pipe swivel joint as defined in claim 4 wherein said means for pressing said inner seal against said O-ring includes spring means, and means for connecting said spring means between said inner seal and said inner element.

7. A pipe swivel joint for connecting together a pair of pipes and for transferring fluid between said pipes at ambient temperatures and at cryogenic temperatures, said joint comprising:
   an annular inner element having an inner surface and an outer surface an annular groove in the outer surface thereof;
   an annular outer element having an inner surface and an outer surface an annular groove in the inner surface thereof, said outer element having a radially inward extending flange at the end thereof, said outer element surrounding said inner element;
   bearing means mounted between said outer element and said inner element, said bearing means comprising a plurality of rollable elements residing in a bearing race chamber that is defined by said grooves in the outer surface of said inner element and in the inner surface of said outer element;

a cryogenic annular seal mounted between the flange on said outer element and the end of said inner element with said cryogenic seal adjacent the outer surface of said inner element;

an ambient annular seal mounted between the flange on said outer element and the end of said inner element with said ambient seal adjacent the inner surface of said inner element; and means for retracting said ambient seal from said flange when the temperature in said swivel joint decreases below a predetermined value.

8. A pipe swivel joint as defined in claim 7 wherein said ambient seal includes an annular O-ring secured to said flange, an annular sealing ring secured to the end of said inner element, temperature sensitive means for pressing said sealing ring against said O-ring at ambient temperatures, and means for moving said sealing ring away from said O-ring at cryogenic temperatures.

9. A pipe swivel joint as defined in claim 8 wherein said means for pressing said sealing ring against said O-ring includes spring means, and means for connecting said spring means between said sealing ring and said inner element.

10. A pipe swivel joint as defined in claim 8 wherein said means for moving said sealing ring away from said O-ring includes a rod having a high coefficient of linear expansion, and means for connecting said rod between said sealing ring and said inner element.

11. A pipe swivel joint as defined in claim 10 wherein said rod includes a coiled portion.

12. A pipe swivel joint as defined in claim 10 wherein said rod is formed of a polymer of tetrafluoroethylene.

* * * * *